(12) United States Patent
Iida

(10) Patent No.: US 6,454,056 B1
(45) Date of Patent: Sep. 24, 2002

(54) DISC BRAKE WITH ANTI-CAMING AND CONSTANT BEARING LENGTH FOR GUIDE PINS

(75) Inventor: Osamu Iida, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/872,380

(22) Filed: May 31, 2001

(51) Int. Cl.[7] .............................................. F16D 65/14

(52) U.S. Cl. .................................................. 188/73.45

(58) Field of Search .......................... 188/73.45, 73.43, 188/73.44, 73.42

(56) References Cited

U.S. PATENT DOCUMENTS

| | | | | |
|---|---|---|---|---|
| 4,805,746 A | * | 2/1989 | Katagiri .................... | 188/73.45 |
| 5,282,521 A | * | 2/1994 | Leist et al. ............... | 188/73.45 |
| 5,749,445 A | * | 5/1998 | Ruiz Bosquets ......... | 188/73.45 |
| 5,819,884 A | * | 10/1998 | Giering ..................... | 188/71.9 |
| 5,934,416 A | * | 8/1999 | Maeda ...................... | 188/71.8 |
| 6,340,076 B1 | * | 1/2002 | Tsuchiya .................. | 188/73.45 |

* cited by examiner

Primary Examiner—Matthew C. Graham
(74) Attorney, Agent, or Firm—Leo H. McCormick, Jr.; Warren Comstock

(57) ABSTRACT

A disc brake having a support member secured to a vehicle with a first guide pin located in a first bore and a second guide pin located in a second bore in support member. The first and second bores are complimentary and define first and second bearing surfaces to align a caliper over a rotor associated with a wheel of the vehicle. A first friction member is connected to the piston retained by the caliper while a second friction member is connected to an arm extending from a bridge member is located on a second side of the rotor. To effect a brake application pressurized fluid acts on the piston to develop a force for moving the first and second friction members into engagement with the rotor to effect a brake application. The caliper is characterized by a first ear that extends from the actuation section while a second ear extends from the arm. The first and second ears being located on opposite sides of the rotor. The first guide pin engages the first ear and is located in the first bore while the second guide pin engages the second ear and is located in the second bore. The engagement of the first and second ears and first and second pins prevent twisting and thereby maintain the first and second friction members parallel alignment with the rotor. With changes in the thickness of the first and second friction members caused by wear engagement with the rotor, the arm moves toward the support member and correspondingly the second guide pin moves into the second bore to increase its bearing length while the actuation section moves away from the support member and correspondingly the first guide pin moves out of the first bore to decrease its bearing length. The increase in the bearing length of the second guide pin and the decrease in the bearing length of the first guide pin are cumulative and as a result a substantially constant bearing length of engagement between the first and second guide pins and the support member occurs with changes in the thickness of the first and second friction members caused by wear engagement with the rotor.

18 Claims, 4 Drawing Sheets

US 6,454,056 B1

DISC BRAKE WITH ANTI-CAMING AND CONSTANT BEARING LENGTH FOR GUIDE PINS

This invention relates to a disc brake for use in a brake system wherein first and second ears on opposite sides of a caliper hold corresponding first and second guide pins substantially perpendicular to a rotor to oppose caliper twisting moments developed on engagement of friction members with a rotor and wherein a substantially constant cumulative bearing length of engagement between the first and second guide pins and a support member may be maintained with changes in thickness of the thickness of the first and second friction members caused by wear engagement with the rotor.

BACKGROUND OF THE INVENTION

Disc brakes wherein two support members, which are spaced apart from each other and slidably guide first and second friction pads on first and guide pins during a brake application are known in the prior art. The following U.S. Pat. Nos. 4,958,703; 5,749,445; 5,810,112; 5,819,884 5,934,416 may be considered to be typical of such disc brakes. In these disc brakes, the first and second guide pins are correspondingly retained in first and second bores in a support member that is fixed to the frame of a vehicle. The first and second guide pins move in the first and second bores as the thickness of the first and second friction pads decrease during the engagement with a rotor and as a result the bearing engagement surface correspondingly decreases. Under some circumstances as the bearing surface decreases, the resistance to a moment caused by the engagement of the friction pads with the rotor may cause twisting of the caliper such that the wear surface of the friction pads is not entirely uniform. This non-uniform wear may result in a need to replace the friction pad before its projected usefulness life is achieved.

SUMMARY OF THE INVENTION

A primary object of the present invention is to provide a disc brake wherein the effect of a caliper twisting moment caused on engagement of friction pads with a rotor is essentially reduced or eliminated while the cumulative bearing length of engagement between the first and second guide pins and a support member remain substantially constant with changes in thickness of the first and second friction pads caused by wear engagement with a rotor.

In more particular detail, the disc brake has a support member secured to a vehicle with a first guide pin located in a first bore and a second guide pin located in a second bore. The first and second bores are, complimentary and define first and second bearing surfaces for aligning a caliper over a rotor associated with a wheel of the vehicle. The caliper is a uniform housing with an actuation section located on a first side of the rotor and connected by a bridge to an arm located on a second side of the rotor. The actuation section has a bore therein for retaining a piston to define an actuation chamber. A first friction member is connected to the piston and a second friction member connected to the arm. To effect a brake application pressurized fluid is presented to the actuation chamber which acts on the piston and actuation section to develop a force for moving the first and second friction members into engagement with the rotor to effect a brake application. The caliper is characterized by a first ear that extends from the actuation section and a second ear that extends from the arm. The first guide pin engages the first ear and is located in the first bore while the second guide pin engages the second ear and is located in the second bore. The engagement of the first and second pins with the first and second pins resists caliper twisting moments caused by off-set forces between friction members on engagement with the rotor to retain the corresponding engagement surfaces of the first and second friction members in a parallel planes with the rotor. With changes in the thickness of the first and second friction member caused by wear engagement with the rotor, the arm moves toward the support member and correspondingly the second pin moves into the second bore to increase its bearing length while the actuation section An advantage of the disc brake results in a uniform wear of a thickness of a friction member on engagement with a rotor.

An object of this invention is to provide a disc brake with a guide pins whereby a cumulative bearing length remains constant with a decrease in a thickness of friction pads caused by wear.

DETAILED DESCRIPTION

Figure 1:
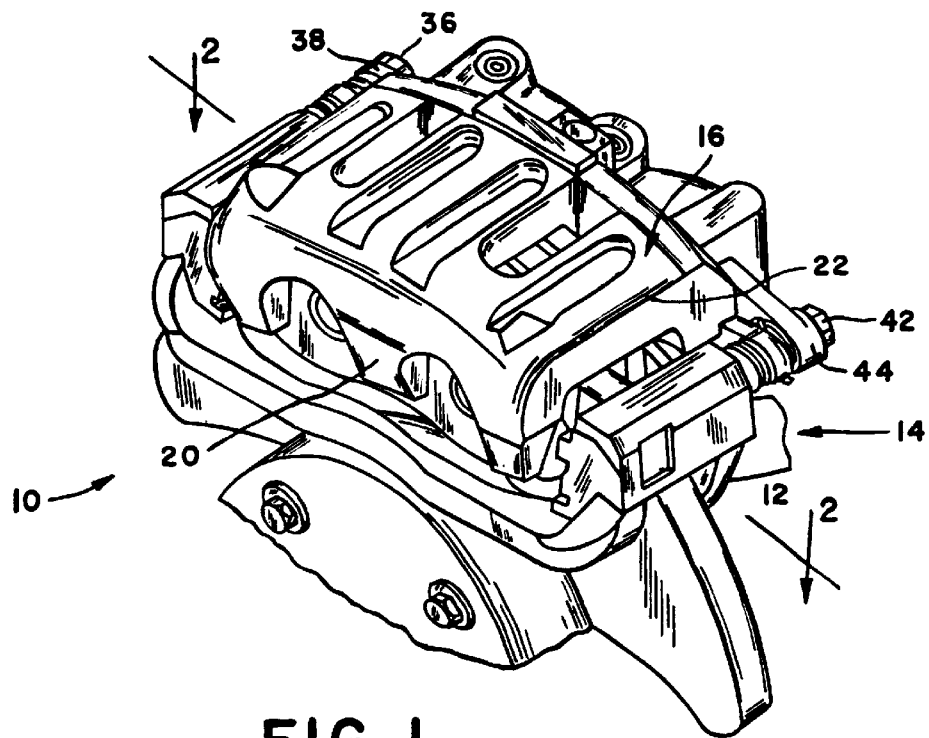
FIG. 1 is a perspective view of a prior art disc brake.
Figure 2:
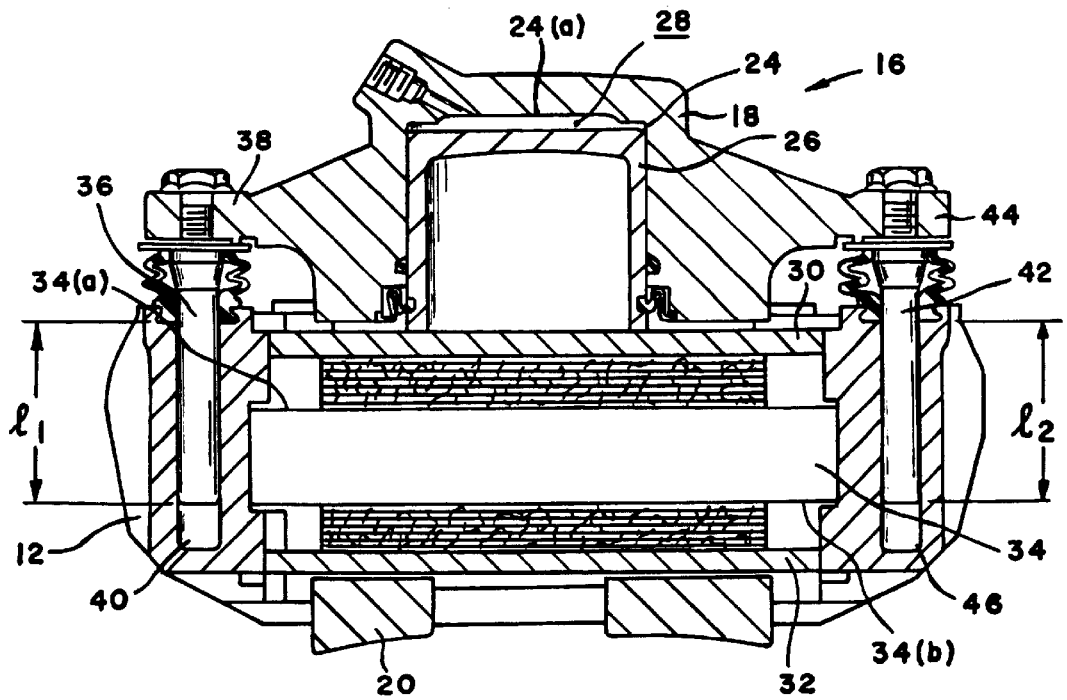
FIG. 2 is a sectional view of FIG. 1 taken along lines 2—2 illustrating an initial relationship between first and second guide pins, friction pads, a support member and a rotor of the disc brake.

The disc brake 10 shown in FIGS. 1 and 2 is of a type known in the prior art, see U.S. Pat. No. 5,810,122, wherein an anchor or support member 12 which is fixed to the housing 14, in a manner as disclosed in U.S. Pat. No. 5,988,761, for use in a brake system of a vehicle. Disc brake 10 has an integral caliper 16 that includes an actuation section 18 that is connected by a bridge 22 to an arm 20. The actuation section 18 has a bore 24 therein for retention of a piston 26 to define an actuation chamber 28. A first friction member 30 is connected to piston 26 while a second friction member 32 is connected to arm 20. The first 30 and second 32 friction members are respectively located adjacent a first face 34a and a second face 34b of a rotor 34 which is connected to rotate with an axle of the vehicle. A first guide pin 36 is connected to ear 38 which extends from the actuation section 18 and is mounted to slide in a first bore 40 in the support member 12. A second guide pin 42 is connected to ear 44 which extends from the actuation section 18 and is mounted to slide in a second bore 46 in the support member 12. The first 40 and second 46 bores are parallel to each other and designed to respectively hold the first guide pin 36 and the second guide pin 42 in a perpendicular relationship with respect to the rotor 34 such that the first friction member 30 and the second friction member 32 are held in corresponding planes respectively parallel with faces 34a and 34b on rotor 34. When an operator desires to effect a brake application, pressurized fluid is supplied to an actuation chamber 28 of bore 24. The pressurized fluid acts on piston 26 and the bottom 24a of bore 24, to develop a force which moves the first friction member 30 into engagement with face 34a and the second friction member 32 into engagement with face 34b of rotor, see FIG. 2, to retard the rotation of rotor 34 and effect a brake application.

In this disc brake 10, the bearing support for the first guide pin 36 and second guide pin 42 is defined by an initial length "$I_1$ and $I_2$" and carries torque forces developed during a brake application from the caliper 16 into the support member 12. The cumulative bearing support "L" is defined by $I_1$ plus $I_2$ and initially $I_1$ and $I_2$ have equal length. During a brake application, a leading edge of each friction members 30 and 32, as defined by the rotation of rotor 34, first engage the rotor 34 and as a result introduce a rotational moment or force into caliper 16 which is part of the torque forces experienced during a brake application.

Figure 3:
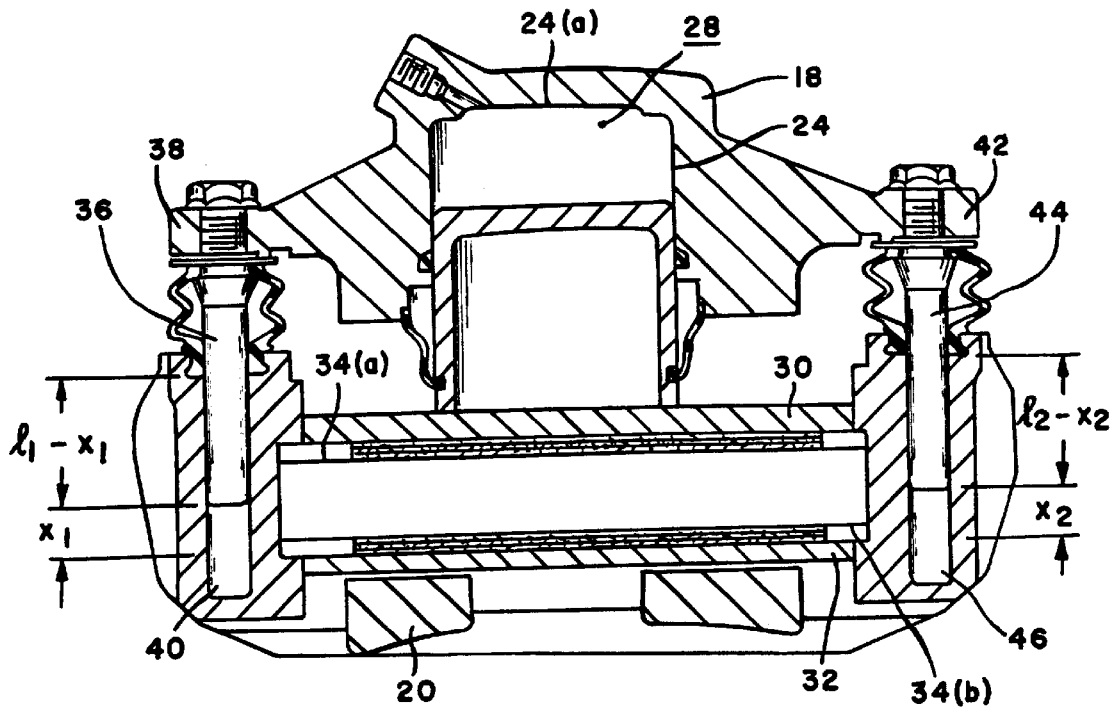
FIG. 3 is a sectional view illustrating the relationship of the components shown in of FIG. 2 after wear has reduced the thickness of the friction pads causing a proportionally reduction in the bearing support for the first and second guide pins.

Disc brake 10 functions in an adequate manner, however, after a period of time, the thickness of the first 30 and second 32 friction members are reduced through wear, see the illustration in FIG. 3. When this situation occurs, the bearing support for the first 36 and second 42 guide pins is correspondingly reduced by the decrease in thickness of the friction pads results in bearing lengths of $I_1-x_1$ and $I_2-x_2$ to provide an on-going overall bearing support of $L=(I_1-x_1)+(I_2-x_2)$ where: $x_1$ is the wear of the first friction member and $x_2$ is the wear of the second friction member. This decrease in bearing length results in an increase in a strength requirement for the first 36 and second 42 guide pins as they now must be capable of carrying additional torque forces into the support member 12. Further, as the thickness of the first 30 and second 32 friction members decrease, additional forces make it harder for the first 36 and second 42 guide pins to hold the first 30 and second 32 friction members in corresponding planes which are parallel with faces 34a and 34b of rotor. If the first 30 and second 32 friction members are not in parallel planes, a result a leading edge on the first 30 and second 32 friction members may wear at a faster rate than a trailing edge which may require replacement of the first 30 and second 32 friction members at an earlier time than with uniform wear.

Figure 4:
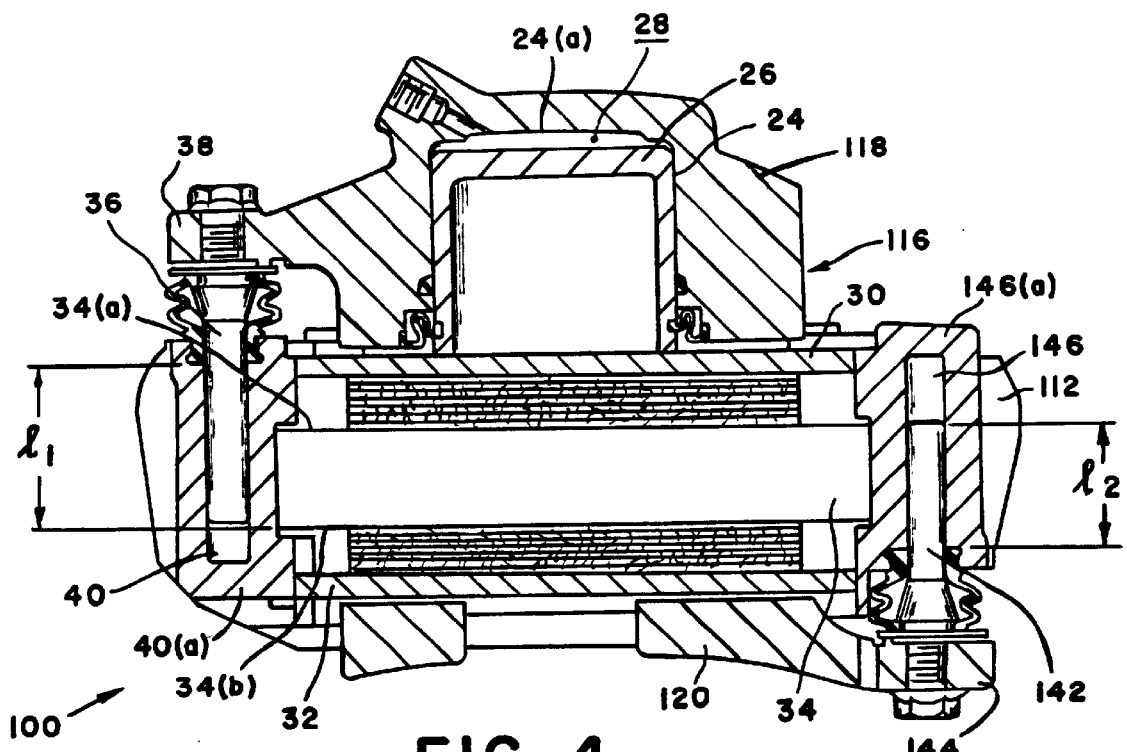
FIG. 4 is a schematic illustration of a disc brake made according to the principals of the present invention illustrating an initial relationship between a first guide pin located by a first ear in a first bore a support member and a second guide pin located by a second ear in a second bore in the support member wherein the first and second bores are located on opposite sides of support member to oppose twisting moments developed during a brake application.
Figure 5:
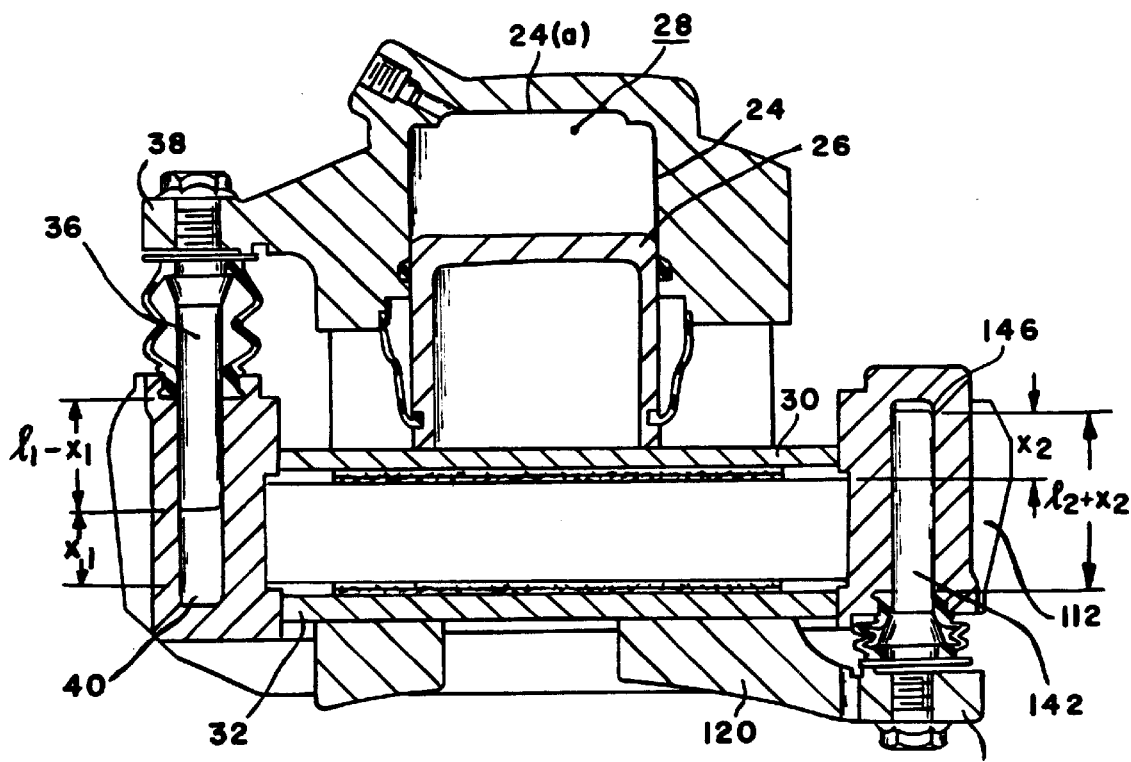
FIG. 5 is a sectional view showing the relationship of the components illustrated in FIG. 4 with a decrease in the thickness of the friction members whereby a constant commutative bearing length is maintained between the first and second guide pins and the support member.
Figure 6:
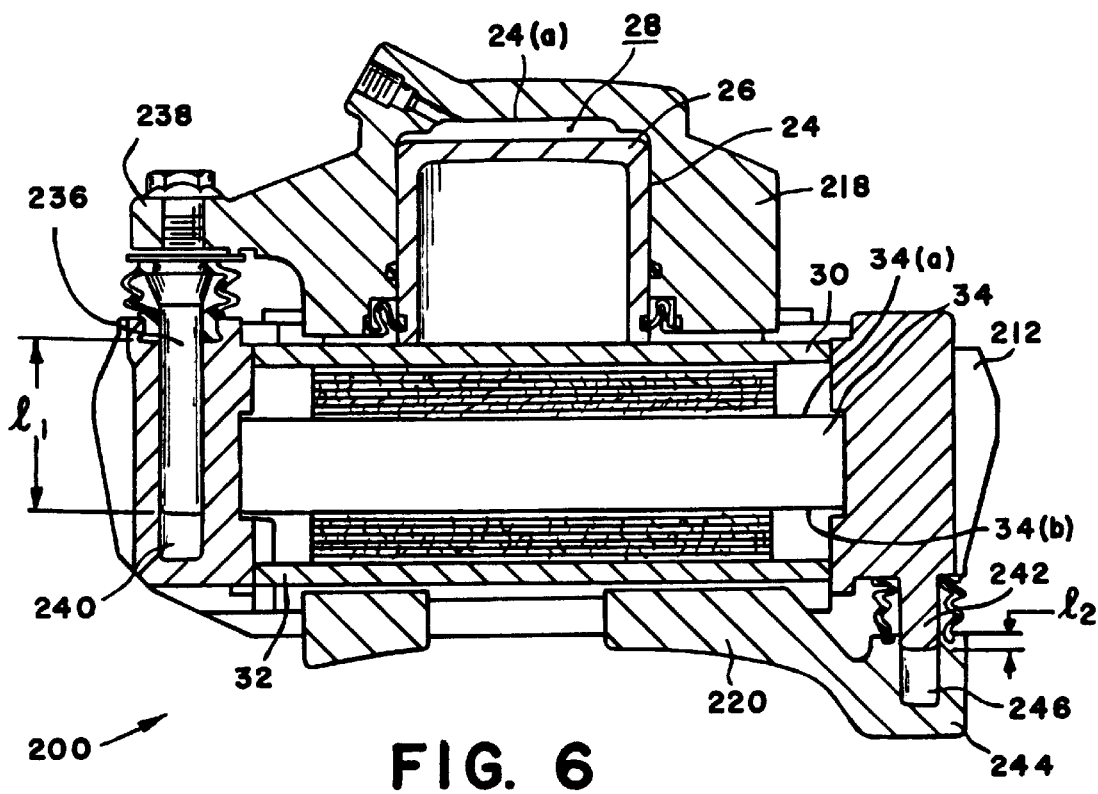
FIG. 6 is a second embodiment of the disc brake of the present invention wherein a first bore is located in the support member and a second bore is located in the caliper.
Figure 7:
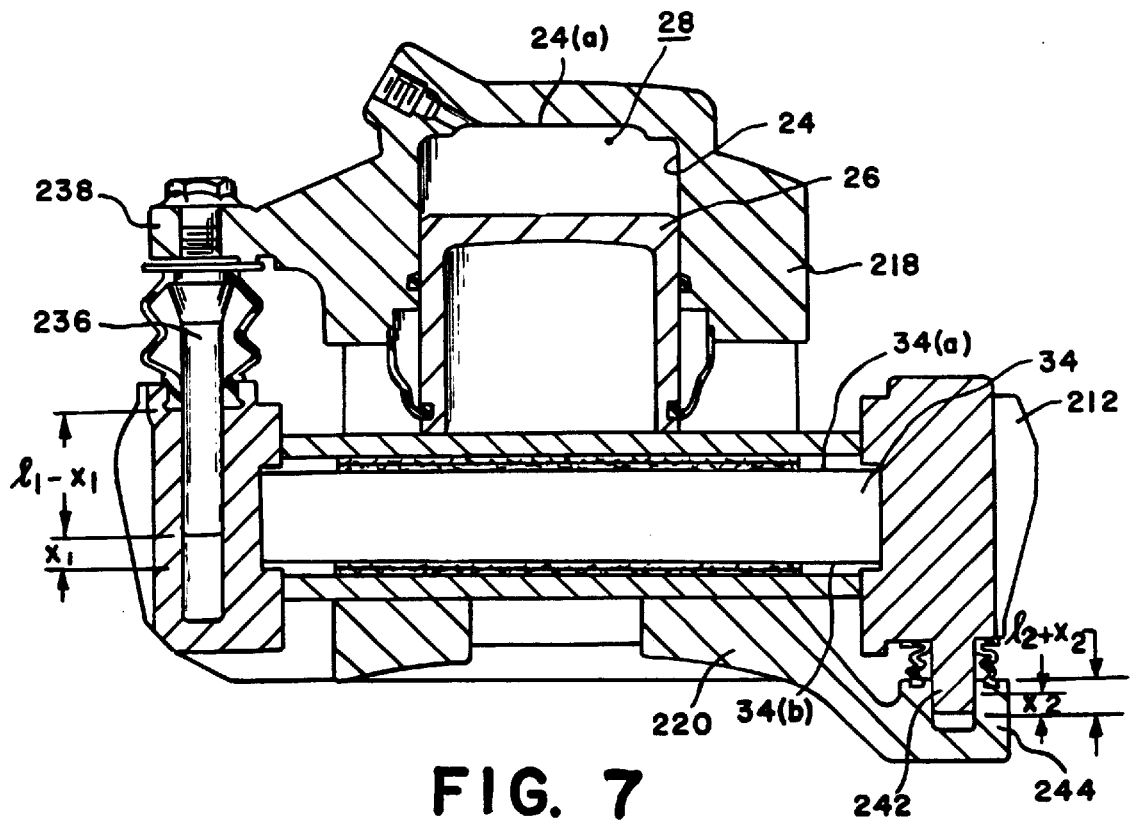
FIG. 7 is a sectional view showing the relationship of the first and second guide pins in the first and second bores of the disc brake illustrated in FIG. 6 after wear has reduced the thickness of the friction pads and wherein a constant commutative bearing length between the first and second guide pins and the support is maintained with a decrease in a thickness of friction member caused by wear engagement with a rotor.
Figure 8:
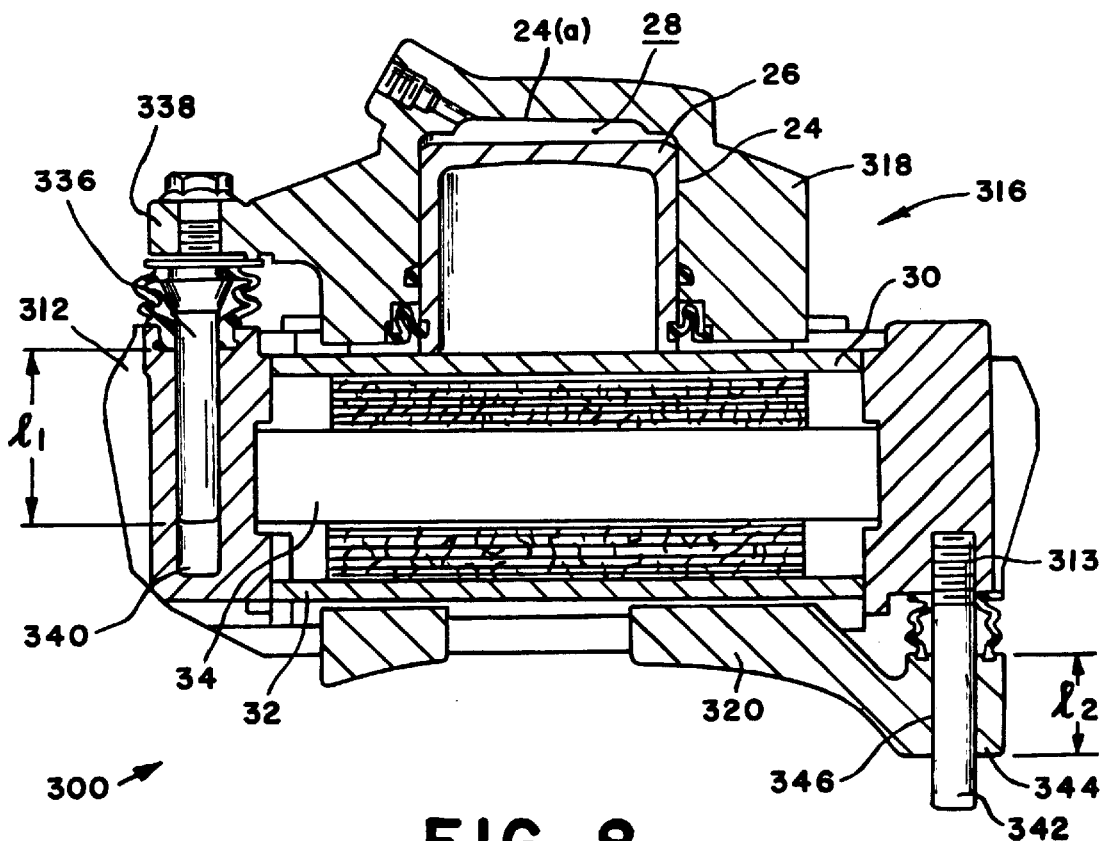
FIG. 8 is another embodiment of the disc brake of the present invention showing the relationship of the components wherein a first guide pin is secured to the caliper and a second guide pin is secured to the support member and correspondingly engage first and second ears of the support member and caliper to resist twisting moments created on engagement of friction pads with a rotor.

The various embodiments of disc brake 100, 200, 300 of the present invention essentially eliminates problems relating to twisting and a reduction in the bearing surface between guide pins and a support member in a disc brake 10 caused by engagement of friction members with a rotor. Disc brake 100 as illustrated in FIGS. 4 and 5, is essentially identical in structure to the disc brake 10 of FIG. 1 with the exception of the caliper 116. Disc brake 200 as illustrated in FIGS. 6 and 7 and is essentially identical in function to disc brake 100 FIG. 4 with the exception of the alignment bores. Disc brake 300 as illustrated in FIG. 8 is functionally similar to the disc brake 200 of, FIG. 6.

In the details of the invention, only when a difference in structure occurs will a new number be used to identify such structure, otherwise the same number is used to identify the component and describe its operation with respect to the disc brakes in the various embodiments of the invention.

In particular detail, the disc brake 100, as shown in FIGS. 4 and 5, has a support member 112 that is secured to a vehicle. The support member 112 has an integral first bore 40 that is parallel with a second bore 146 and corresponding closed ends 40a and 146a that are located on opposite sides of a peripheral surface of a rotor 34. Caliper 116 has an actuation section 118 with a first ear 38 that extends therefrom while arm 120 has a second ear 144 that extends therefrom. A first guide pin 36 is connected to the first ear 38 and is located in the first bore 40 while a second guide pin 142 is connected to the second ear 144 and is located in a second bore 146 to align the caliper 116 over a rotor 34 on a vehicle. The bearing length for the first guide pin 36 that extends into the first bore 40 is $I_1$ and the bearing length for the second guide pin 142 is $I_2$ that extends into the second bore 146. The first bearing length $I_1$ and the second bearing length $I_2$ have an initial cumulative length of L ($L_{initial}=I_1+I_2$). As with disc brake 10, when pressurized fluid is presented to actuation chamber 28, the pressurized fluid acts to and moves piston 26 away from the bottom 24a of bore 24 and correspondingly moves the first friction member 30 into engagement with face 34a on rotor 34 and the second friction member 32 into engagement with face 34b on rotor 34 to retard the rotation of rotor 34 to effect a brake application. With the first ear 38 located on actuation section 118 and the second ear 144 located on arm 120, in a manner as illustrated, greater resistance .is provided to prevent any movement caused by the rotational moment (twisting torque) developed during a brake application.

The disc brake 100, shown in FIG. 4, will function in a consistent during an entire life of the friction members 30 and 32 even though guide pin 142 is shorter than guide pin 36 as the cumulative on-going bearing support $L_{on-going}$ remains constant, see FIG. 5. In disc brake 100 cumulative on-going bearing support $L_{on-going}$ remains constant with a decrease in the thickness of the friction members 30 and 32 defined by $x_1$ and $x_2$ caused by wear because a decrease in the bearing support length $I_1-x$ of pin 36 in bore 40 results in a corresponding increase in the bearing support length $I_2+x$ of pin 142 in bore 146. Thus, the bearing support through which part of the braking torque is transmitted from caliper 116 into support member 112 remains constant for an entire life of the friction members 30 and 32 of disc brake 100.

In more particular detail, disc brake 200, as illustrated in FIGS. 6 and 7 while functionally similar to disc brake 100 of FIG. 4 is distinguished by a first guide pin 236 is located in bore 240 in support member 212 and a second guide pin 242 is located in a bore 246 in the arm 220. The support member 212 has a first bore 240 which receives a first pin 236 connected to a first ear 238 that extends from the actuation section 218 while a caliper 216 has a second bore 246 which is located in ear 244 on arm 220 for receiving a second guide pin 242 that extends from the support member 212. The first bore 240 and second guide pin 242 are parallel to each other and designed to respectively receive the first guide pin 236 and second bore 246 such that the first 30 and second 32 friction members, connected to piston 26 and arm 220, are maintained in corresponding planes parallel with faces 34a and 34b on rotor 34. The bearing support length $I_1$ of the first guide pin 236 that extends into the first bore 240 and the support length 12 of the second guide pin 242 that extends into the second bore 246 define bearing surfaces that have an initial cumulative support length equal to $L_{initial}$ ($L=I_1+I_2$). As with disc brake 10, when pressurized fluid is presented to actuation chamber 28, pressurized fluid acts on and moves piston 26 away from the bottom 24a of bore 24 to correspondingly move the first friction member 30 into engagement with face 34a on rotor 34 and the second friction member 32 into engagement with face 34b on rotor 34 to retard the rotation of rotor 34 and effect a brake application. With the first ear 238 located on actuation section 218 and the second ear 244 located on arm 220 in a manner as illustrated in FIG. 6, resistance is provided to prevent any twisting movement caused by the rotational moment developed during a brake application.

Disc brake 200 functions in a consistent manner during an entire life of the friction members 30 and 32 (assuming equal wear) even though guide pin 242, as illustrated in FIG. 7, is shorter than guide pin 36. The cumulative on-going bearing support length $L_{on-going}$ remains constant because a decrease in the thickness of the friction members 30 and 32 caused by wear produces a decrease in the length of bearing support $(I_1-x_1)$ of 236 in bore 240 results in a corresponding increase in the length of bearing support $(I_2+x_2)$ of pin 242 in bore 246. Thus, the cumulative bearing support length $L_{on-going}$, through which part of the braking torque is transmitted from caliper 216 into support member 12, remains constant for the disc brake 200.

In more particular detail disc brake 300 which is illustrated in FIG. 8 functions in a manner similar to disc brake 200 of FIG. 6 to oppose rotative moments introduced through the engagement of friction members 30 and 32 with rotor 34 but is distinguished therefrom by a first guide pin 336 which is located in bore 340 in support member 312 and a second guide pin 342 which is located in a bore 346 in the arm 320 of caliper 316. The support member 312 has a first bore 340 which receives a first pin 336 which is connected to a first ear 338 which extends from the actuation section 318 of a caliper 316. Support member 312 has a second bore 313 which receives a threaded end of a second pin 342 that extends through a second bore 346 located in an ear 344 on arm 320. The first bore 340 and second guide pin 342 are parallel to each other, such that the first bore 340 receives the first guide pin 336 while the second bore 346 receives the second guide pin 342 and correspondingly the first 30 and second 32 friction members connected to piston 26 and arm 320 are maintained in planes parallel with faces 34a and 34b on rotor 34. The bearing support length $I_1$ of the first guide pin 336 that extends into the first bore 240 and the bearing support length $I_2$ of the second guide pin 342 that extends into the second bore 246 define bearing surfaces which have an initial cumulative length "L" ($L=_1+I_2$). When pressurized fluid is presented to actuation chamber 28, the pressurized fluid acts on and moves piston 26 away from the bottom 24a of bore 24 to correspondingly move the first friction member 30 into engagement with face 34a on rotor 34 and the second friction member 32 into engagement with face 34b on rotor 34 to retard the rotation of rotor 34 and effect a brake application. With the first ear 338 being located on actuation section 318 and the second pin 342 being held by ear 344 on arm 320 resistance is provided to prevent caliper rotational twisting developed during a brake application.

Disc brake 300 functions in a manner to resist rotational moments during an entire life of the friction members 30 and 32, however, the total bearing support L is equal to $(I_1-x_1+I_2)$ as the total in this embodiment is reduced by an amount equal to a decrease in the thickness by an amount equal to $x_1$ caused by wear of the first friction member as the bearing support of guide pin 342 remains constant with respect to ear 344. However, even with an overall decrease in the on-going bearing support length of disc brake 300 as compared with disc brake 100 shown in FIG. 4 and disc brake 200 shown in FIG. 6, the disc brake 300 shown in FIG. 8 provides an improvement over the known disc brakes in the prior art as shown in FIG. 1. Indeed, if the fixed pin and the sliding pin [as] shown in FIG. 8 were reversed, a resulting bearing length would be defined by $L=I_1+x+I_2$ wear of the friction members which would be greater than either disc brake 100 or disc brake 200.

I claim:
1. In a disc brake having a support member secured to a vehicle, a first guide pin located in a first bore and a second guide pin located in a second bore to define first and second bearing surfaces that align a caliper over a rotor associated with a wheel of the vehicle, said caliper having an actuation section connected by a bridge to an arm, said actuation section having an actuation bore therein for retaining a piston to define an actuation chamber, a first friction member connected to said piston and a second friction member connected to said arm, said actuation chamber on being presented pressurized fluid from a source acting on said piston and actuation section to develop a force for moving said first and second friction members into engagement with said rotor to effecting a brake application, said caliper being characterized by a first ear extending from said actuation section and a second ear extending from said arm, said first guide pin being located by said first ear in said first bore and said second guide pin being located by said second ear in said second bore, said first pin having a first bearing length and said second pin having a second bearing length, said first bearing length and said second bearing length being substantially equal when said first and second friction members are new and with changes in thickness of said first and second friction members caused by wear engagement with said rotor said first bearing length of said first pin decreases while said bearing second length of said second pin increases to maintain said a substantially constant cumulative bearing length of engagement between said first and second guide pins and said support member.

2. In the disc brake as recited in claim 1 wherein said first and second ears resist any twisting moment caused by engagement of said first and second friction members with said rotor to maintain said first and second friction members in a parallel alignment with said rotor.

3. In the disc brake as recited in claim 1 wherein said first guide pin is characterized by being longer than said second guide pin.

4. In a disc brake having a support member secured to a vehicle, a first guide pin located in a first bore and a second guide pin located in a second bore to define first and second bearing surfaces that align a caliper over a rotor associated with a wheel of the vehicle, said caliper having an actuation section connected by a bridge to an arm, said actuation section having an actuation bore therein for retaining a piston to define an actuation chamber, a first friction member connected to said piston and a second friction member connected to said arm, said actuation chamber on being presented pressurized fluid from a source acting on said piston and actuation section to develop a force for moving said first and second friction members into engagement with said rotor to effecting a brake application, said caliper being characterized by a first ear that extends from said actuation section and a second ear that extends from said arm, said first guide pin being secured to said first ear and located in said first bore in said support and said second guide pin being secured to said support member and retained in said bore in said second ear, said arm being moved toward said support member during a brake application and correspondingly said second pin moves into said second bore to increase its bearing length while said actuation section moves away from said support member and said first pin moves out of said first bore to decrease its bearing length to maintain a substantially constant cumulative bearing length of engagement between said first and second guide pins and said support member with changes in thickness of said first and second friction members caused by wear engagement with said rotor, said first ear and said second ear being located on opposite sides of said rotor to hold said first and second guide pins perpendicular with said rotor to prevent twisting movement of said caliper with respect to said support member during a brake application.

5. In a disc brake having a support member secured to a vehicle, a first guide pin located in a first bore and a second guide pin located in a second bore to define first and second bearing surfaces for aligning a caliper over a rotor associated with a wheel of the vehicle, said caliper having an actuation section connected to an arm by a bridge, said actuation section having an actuation bore therein for retaining a piston to define an actuation chamber, a first friction member being connected to said piston and a second friction member being connected to said arm, said actuation chamber on being presented pressurized fluid from a source acting on said piston and actuation section to develop a force for moving said first and second friction members into engagement with said rotor to effect a brake application, said caliper being characterized by a first ear extending from said actuation section and a second ear extending from said arm, said first guide pin being secured to said first ear and located in said first bore and said second guide pin being located and sliding in said second bore in said second ear, said first ear engaging said first pin and said second ear engaging said second pin to oppose a twisting moment caused by off-set forces between said first and second friction members and said rotor to thereby maintain said first and second friction members in parallel alignment with said rotor during a brake application, and in that a bearing length of engagement of said first guide pin decreases while said a bearing length of engagement of said second guide pin remains constant with a decrease in a thickness of said first and second friction members caused by wear engagement with said rotor.

6. In a disc brake having a support member secured to a vehicle with a first guide pin located in a first bore and a second guide pin located in a second bore to define first and second bearing surfaces that align a caliper over a rotor associated with a wheel of the vehicle, said caliper having an actuation section connected to an arm by a bridge and an actuation bore therein for retaining a piston to define an actuation chamber, a first friction member being connected to said piston and a second friction member being connected to said arm, said actuation chamber on being presented pressurized fluid from a source acting on said piston and actuation section to develop a force for moving said first and second friction members into engagement with said rotor to effect a brake application, said first and second friction members after a number of engagements with said rotor being reduced in thickness through wear in a manner to effect the length of said first and second bearing surfaces, said caliper being characterized by means whereby a decrease in said first bearing surface creates an increase in said second bearing surface to produce a substantially constant cumulative bearing length of engagement between said first and second guide pins and said support member with changes in said thickness of said first and second friction members caused by wear engagement with said rotor, said first guide pin being carried by said actuation section and said second guide pin is carried by said arm such that said first and second guide pins are located on opposite sides of said rotor and oppose twisting torque developed during a brake application, said first and second bearing surfaces are characterized by an initial cumulative length of $L_{initial}$, which is defined as:

$$L_{initial} = (l_1 + l_2)$$

where:

$l_1$ is the initial bearing length of said first pin; and $l_2$ is the initial bearing length of said second pin;

and an on-going cumulative length of $L_{on\text{-}going}$ which is defined as:

$$L_{on\text{-}going} = (l_1 - x_1) + (l_2 + x_2)$$

where:

$l_1$ is the initial bearing length of said first pin, $l_2$ is the initial bearing length of said second pin, $x_1$ is the wear of the first friction member and $x_2$ is the wear of the second friction member, such that with $x_1$ and $x_2$ being equal said $L_{on\text{-}going}$ remains equal to $L_{initial}$ to produce said substantially constant cumulative bearing in said disc brake.

7. In a disc brake having a support member secured to a vehicle, a first guide pin located in a first bore and a second guide pin located in a second bore to define first and second bearing surfaces that align a caliper over a rotor associated with a wheel of the vehicle, said caliper having an actuation section connected by a bridge to an arm, said actuation section having an actuation bore therein for retaining a piston to define an actuation chamber, a first friction member connected to said piston and a second friction member connected to said arm, said actuation chamber on being presented pressurized fluid from a source acting on said piston and actuation section to develop a force for moving said first and second friction members into engagement with said rotor to effecting a brake application, said caliper being characterized by a first ear extending from said actuation section and a second ear extending from said arm, said first guide pin being located by said first ear in said first bore and said second guide pin being located by said second ear in said second bore, said first and second ears being located on opposite sides of said rotor to resist any twisting moment caused by engagement of said first and second friction members with said rotor and thereby maintain said first and second friction members in a parallel alignment with said rotor, said first guide pin engaging said first bore and said second guide pin engaging said second bore to maintain a substantially constant cumulative bearing length of engagement with changes in thickness of said first and second friction members caused by wear engagement with said rotor.

8. In the disc brake as recited in claim 7 wherein said first and second bores in said support member are characterized as being parallel to said actuation bore.

9. In the disc brake as recited in claim 7 wherein said caliper is characterized by said first guide pin being secured to said first ear and said second guide pin being secured to said second ear and in that a decrease in bearing length of engagement of said first guide pin creates a corresponding increase in a bearing length of engagement of said second guide pin to maintain said substantially constant cumulative bearing length.

10. In the disc brake as recited in claim 7 wherein said first guide pin has a first bearing length and said second guide pin has a second bearing length, said first bearing length and said second bearing length being substantially equal when said first and second friction members are new and as said first and second friction members wear said first bearing length decreases while said bearing second length increases such that said substantially cumulative bearing length of engagement between said first and second guide pins and said support member remains constant.

11. In the disc brake as recited in claim 10 wherein said first guide pin is characterized by being longer than said second guide pin.

12. In the disc brake as recited in claim 7 wherein said first guide pin is characterized by being secured to said first ear and said second guide pin is characterized by being secured to said support member and slides in an opening in said second ear to movement of said caliper with respect to said support member by said twisting moment.

13. In the disc brake as recited in claim 11 wherein said arm moves toward said support member and correspondingly said second guide pin moves into said second bore to increase its bearing length while said actuation section moves away from said support member and said first guide pin moves out of said first bore to decrease its bearing length with a corresponding decrease in a thickness of said first and second friction members.

14. In the disc brake as recited in claim 7 wherein said first and second ears correspondingly engage said first and second pins to hold said first and second friction members in first and second planes parallel with respect to said rotor and oppose said twisting moment to hold corresponding engagement faces on said first and second friction members in parallel engagement with said rotor to provide uniform wear from a leading edge to a trailing edge on each of said first and second friction members.

15. In the disc brake as recited in claim 7 wherein said first and second ears are integral with said caliper and said first and second bores are integral with said support member.

16. In the disc brake as recited in claim 7 wherein said caliper is characterized by said first guide pin being secured to said first ear and said second guide pin slides in said second bore located in said second ear and in that a bearing length of engagement of said first guide pin decreases while a bearing length of engagement of said second guide pin remains increases with a decrease in a thickness of said first and second friction members caused by wear engagement with said rotor.

17. In the disc brake as recited in claim 7 wherein said first guide pin has a first bearing length and said second guide pin has a second bearing length, said first guide pin sliding in said first bore while said second guide pin being fixed in said support such that said second ear slides on said second guide pin.

18. In the disc brake as recited in claim 7 wherein said arm moves toward said support member and correspondingly said second guide pin moves into said second bore located in said second ear to increase a bearing length of said second guide pin while said actuation section moves away from said support member and correspondingly said first guide pin moves out of said first bore to decrease said a bearing length of said first pin with a decrease in a thickness of said first and second friction members to sustain said substantially constant cumulative bearing length.

* * * * *